(12) United States Patent
Yi (10) Patent No.: US 7,519,017 B2
(45) Date of Patent: Apr. 14, 2009

(54) SAVING POWER IN WIRELESS LOCAL AREA NETWORK

(75) Inventor: Sang-Kug Yi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 879 days.

(21) Appl. No.: 10/919,511

(22) Filed: Aug. 17, 2004

(65) Prior Publication Data
US 2005/0047386 A1  Mar. 3, 2005

(30) Foreign Application Priority Data
Sep. 3, 2003  (KR) ...................... 10-2003-0061588

(51) Int. Cl.
H04Q 7/00 (2006.01)

(52) U.S. Cl. ........................ 370/318; 370/328; 370/346; 370/338; 370/449; 370/329; 455/574; 455/522; 455/517; 455/509

(58) Field of Classification Search ................. 370/311, 370/318, 322, 338, 328–329, 449, 468, 458, 370/445, 345–350; 455/435.1, 547, 509, 455/450, 517, 522, 574; 713/330; 340/7.32
See application file for complete search history.

(56) References Cited

U.S. PATENT DOCUMENTS

| | | | | |
|---|---|---|---|---|
| 5,241,542 | A * | 8/1993 | Natarajan et al. ............ | 370/311 |
| 6,862,456 | B2 * | 3/2005 | Sugar et al. .................. | 455/503 |
| 7,027,465 | B2 * | 4/2006 | Hautala ....................... | 370/506 |
| 7,167,732 | B2 * | 1/2007 | Choi et al. ................... | 455/574 |
| 2001/0015963 | A1 | 8/2001 | Tuomainen et al. | |
| 2002/0132603 | A1 | 9/2002 | Lindskog et al. | |
| 2003/0031140 | A1 | 2/2003 | Oprescu-Surcobe et al. | |
| 2003/0142641 | A1 | 7/2003 | Sumner et al. | |
| 2003/0161340 | A1 | 8/2003 | Sherman | |
| 2003/0210658 | A1 | 11/2003 | Hernandez et al. | |
| 2004/0008661 | A1 | 1/2004 | Myles et al. | |
| 2004/0037258 | A1 | 2/2004 | Scherzer et al. | |
| 2004/0105412 | A1* | 6/2004 | He et al. ...................... | 370/338 |
| 2004/0141490 | A1* | 7/2004 | Hong ........................... | 370/345 |
| 2004/0190467 | A1* | 9/2004 | Liu et al. ..................... | 370/311 |
| 2005/0018624 | A1* | 1/2005 | Meier et al. .................. | 370/318 |

(Continued)

FOREIGN PATENT DOCUMENTS

JP  9-284179  10/1997

(Continued)

*Primary Examiner*—Kamran Afshar
(74) *Attorney, Agent, or Firm*—Robert E. Bushnell, Esq.

(57) ABSTRACT

A method and apparatus includes: at least one AP (Access Point) arranged to set and transmit a bit of a beacon message corresponding to a station for exchanging traffic, to register the station on a PS-polling list upon an acknowledgment of the beacon message being received, to assign a predetermined time slot to the station, and to transmit the traffic during the time slot, when at least one piece of traffic is exchanged for wireless voice communication; and at least one station adapted to be awakened into an active mode to parse the received beacon message, to calculate the assigned time slot when a bit of the station is set, and to awaken into the active mode during the assigned time slot to exchange the traffic, when the beacon message has been received from the AP upon being in a doze mode.

10 Claims, 6 Drawing Sheets

U.S. PATENT DOCUMENTS

2005/0059386 A1* 3/2005 Li ............................ 455/420
2005/0250528 A1* 11/2005 Song et al. ................ 455/522
2006/0079183 A1* 4/2006 Song et al. ................ 455/63.1
2006/0153375 A1* 7/2006 Yi .............................. 380/44
2007/0248034 A1* 10/2007 Hsu et al. .................. 370/318

FOREIGN PATENT DOCUMENTS

JP         2003-124940         4/2003

* cited by examiner

SAVING POWER IN WIRELESS LOCAL AREA NETWORK

CLAIM OF PRIORITY

This application makes reference to, incorporates the same herein, and claims all benefits accruing under 35 U.S.C. § 119 from an application for APPARATUS AND METHOD FOR SAVING POWER IN WIRELESS LOCAL AREA NETWORK SYSTEM earlier filed in the Korean Intellectual Property Office on Sep. 3, 2003 and there duly assigned Serial No. 2003-61588.

BACKGROUND OF THE INVENTION

1. Field of the Invention

The present invention relates to saving power in a wireless Local Area Network (LAN) and, more particularly, to saving power in a wireless LAN, in which a ratio of a doze mode to an active mode of a voice terminal effecting voice communication according to the IEEE 802.11 standard is efficiently managed, thereby increasing a time to allow the voice terminal to effect voice communication.

2. Description of the Related Art

The IEEE 802.11 wireless LAN standard follows "Standard for Information technology-Telecommunications and information exchange between systems-Local and metropolitan area networks-Specific requirements-Part 11: Wireless LAN Medium Access Control (MAC) and Physical Layer (PHY) Specifications," 1999 Edition.

Hereinafter, the wireless LAN standard of IEEE is referred to as the IEEE 802.11 standard. This standard defines the Media Access Control (MAC) and PHYsical (PHY) layers for a wireless LAN.

The MAC layer defines orders and rules which a terminal or apparatus using shared media must obey during the use/access of the shared media, thereby making it possible to efficiently use the shared media. IEEE 802.11 defines two types of access control mechanisms, a Distributed Coordination Function (DCF) and a Point Coordination Function (PCF).

The following patents each discloses features in common with the present invention but do not teach or suggest the inventive features specifically recited in the present application: U.S. Patent Application No. 2004/0008661 to Myles et al., entitled METHOD AND APPARATUS FOR CLOCK SYNCHRONIZATION IN A WIRELESS NETWORK, published on Jan. 15, 2004; U.S. Patent Application No. 2004/0037258 to Scherzer et al., entitled SPACE-TIME-POWER SCHEDULING FOR WIRELESS NETWORKS, published on Feb. 26, 2004; U.S. Patent Application No. 2003/0142641 to Sumner et al., entitled MANAGING WIRELESS NETWORK DATA, published on Jul. 31, 2003; U.S. Patent Application No. 2003/0031140 to Oprescu-Surcobe et al., entitled METHOD AND APPARATUS FOR EXTENDING COMMUNICATION UNIT BATTERY LIFE, published on Feb. 13, 2003; U.S. Patent Application No. 2001/0015963 to Tuomainen et al., entitled METHOD FOR REDUCING THE POWER CONSUMPTION OF A MOBILE STATION, published on Aug. 23, 2001; U.S. Patent Application No. 2002/0132603 to Lindskog et al., entitled METHOD FOR POWER SAVE, published on Sep. 19, 2002; U.S. Patent Application No. 2003/0161340 to Sherman, entitled METHOD AND SYSTEM FOR OPTIMALLY SERVING STATIONS ON WIRELESS LANS USING A CONTROLLED CONTENTION/RESOURCE RESERVATION PROTOCOL OF THE IEEE 802.11E, published on Aug. 28, 2003; and U.S. Patent Application No. 2003/0210658 to Hernandez et al., entitled METHOD AND SYSTEM FOR MANAGING POWER CONSUMPTION OF A NETWORK INTERFACE MODULE IN A WIRELESS COMPUTING DEVICE, published on Nov. 13, 2003.

SUMMARY OF THE INVENTION

It is an object of the present invention to save power during Wireless Local Area Network (WLAN) based voice communication, in which a wireless voice terminal effecting voice communication based on a WLAN without violating the IEEE 802.11 standard is efficiently switched between an active mode and a doze mode during the voice communication, thereby decreasing power consumption of the wireless voice terminal to improve communication time.

In order to solve this object, according to one aspect of the present invention, an apparatus is provided comprising: at least one AP (Access Point) arranged to set and transmit a bit of a beacon message corresponding to a station for exchanging traffic, to register the station on a PS-polling list upon an acknowledgment of the beacon message being received, to assign a predetermined time slot to the station, and to transmit the traffic during the time slot, when at least one piece of traffic is to be exchanged for wireless voice communication; and at least one station adapted to be awakened into an active mode to parse the received beacon message, to calculate the assigned time slot when a bit of the station is set, and to awaken into the active mode during the time slot to exchange the at least one piece of traffic, when the beacon message has been received from the AP upon being in a doze mode.

In accordance with another aspect of the present invention, an apparatus is provided comprising: a beacon message processor adapted to detect at least one of a plurality of stations intended to receive at least one piece of traffic, to set a bit of a TIM (Traffic Indication Map) corresponding to the detected station to generate a beacon message, and to transmit the generated beacon message to each station, when there is at least one piece of the traffic to be transmitted to the plurality of stations; a time slot processor adapted to calculate a predetermined time slot to be assigned to each station; and a table management unit adapted to provide number information to the station, to generate and manage a table storing address information and time slot information of the station upon an acknowledgment message of the beacon message being received from the station intended to receive the traffic.

In accordance with yet another aspect of the present invention, an apparatus is provided comprising: a message processor adapted to parse a TIM (Traffic Indication Map) of a beacon message received from an AP (Access Point) and to determine whether or not a bit of the TIM of a station has been set; a time slot calculator adapted to calculate a time when the beacon message has been received, a start time of a time slot when traffic is initially received from the AP and an end time of the time slot when reception of the traffic has been terminated, upon a determination that the bit of the TIM of the station has been set by the message processor; and a mode processor, adapted to be awakened into an active mode upon the beacon message being received when in a doze mode, awakened into the active mode at the start time of the time slot calculated by the time slot calculator upon the determination that the bit of the TIM of the station has been set by the message processor, and placed into the doze mode again at the end time of the slot time.

Preferably, the time slot calculator is adapted to determine that the start time of the time slot has varied upon frames not being exchanged for a predetermined number of times between the start time of the time slot assigned by the AP and the end time of the time slot, and to recalculate the start time of the time slot.

Preferably, the mode processor is adapted to maintain the active mode so as to allow the start time of the time slot to be calculated by the time slot calculator upon a determination that there is traffic to be received by parsing the beacon message received from the message processor, and to then maintain the active mode only between the start time of the time slot and the end time of the time slot while maintaining the doze mode.

In accordance with another aspect of the present invention, a method is provided comprising: setting a bit of a TIM (Traffic Indication Map) corresponding to a station to generate a beacon message and transmitting the generated beacon message to each station upon there being traffic to be transmitted to an arbitrary station; calculating a predetermined time slot and assigning the time slot to each station; assigning number information to the stations and registering the stations on a PS-polling list upon an acknowledgment message of the beacon message being received from the station; and assigning the calculated time slot according to the number information assigned to the stations registered on the PS-polling list, and transmitting the traffic during the time slot assigned to the stations.

Preferably, the PS-polling list includes at least one of number information of the stations transmitting the acknowledgment message, information of the stations, and information on the start time of the time slot assigned to the stations.

In accordance with another aspect of the present invention, a method is provided comprising: awakening at least one station from a doze mode into an active mode and parsing a TIM (Traffic Indication Map) of a beacon message upon the beacon message being received from an AP (Access Point); generating and transmitting an acknowledgment message of the beacon message upon a bit of the TIM assigned to the station being set; calculating a time between the next beacon message being received and the traffic being received after transmission of the acknowledgment message; and placing the station in the doze mode upon the traffic being received, awakening the station into the active mode again upon the calculated time having elapsed, and receiving the traffic from the AP.

Preferably, the method can further comprise recalculating a time for awakening the station into the active mode to receive the traffic upon traffic not being received for a predetermined number of times during the time slot assigned by the AP.

In accordance with yet another aspect of the present invention, a method is provided comprising: setting a bit of a TIM (Traffic Indication Map) of a station to generate and transmit a beacon message; awakening the station from a doze mode into an active mode and parsing the TIM of a received beacon message upon the beacon message being received; transmitting an acknowledgment message of the beacon message to calculate a time when the traffic is received from an AP (Access Point) as the parsed result upon the TIM of the station being set; registering the station on a PS-polling list at the AP upon the acknowledgment message being received from the station; transmitting the traffic during a time slot assigned to the station with reference to the PS-polling list at the AP; calculating a time from the station receiving the beacon message to a time the traffic begins to be received; placing the station from the active mode into the doze mode upon reception of the traffic from the AP being completed; and awakening the station into the active mode after being in standby for the calculated time in the doze mode, and receiving the next traffic from the AP.

Preferably, the method can further comprise awakening the station into the active mode during the time slot assigned by the AP to transmit the traffic upon there being traffic to be transmitted to the AP.

Preferably, the method can further comprise recalculating a time for awakening the station into the active mode to receive traffic upon traffic not being received for a predetermined number of times during the time slot assigned by the AP.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully hereinafter with reference to the accompanying drawings, in which an exemplary embodiment of the present invention is shown. The present invention can, however, be embodied in different forms and should not be construed as being limited to the embodiment set forth herein. Rather, the exemplary embodiment has been provided to make this disclosure thorough and complete, and to fully convey the scope of the present invention to those skilled in the art. Like numbers refer to like elements throughout the specification.

Figure 1:
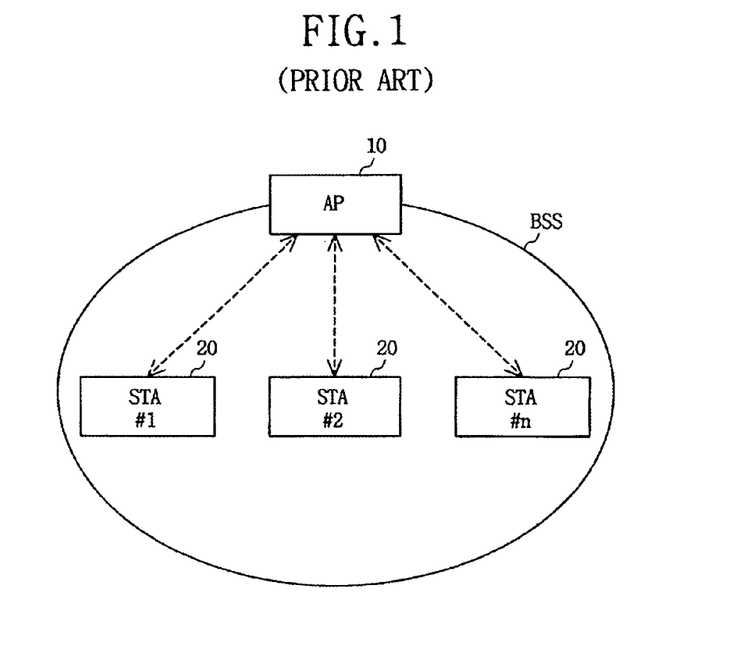
FIG. 1 is a block diagram of an overall configuration of a wireless communication system according to IEEE 802.11.

FIG. 1 is a block diagram of an overall configuration of a wireless communication system according to IEEE 802.11.

As shown in FIG. 1, an access point (AP) 10 is wirelessly connected to a plurality of stations (STA) 20 #1 to 20 #n.

There is an area called a basic service set (BSS), which consists of the AP 10 and the plurality of STAs 20 #1 to 20 #n and which is capable of performing wireless communication.

In the BSS, traffic between the AP 10 and each STA 20 can be exchanged by two schemes, the DCF (Distributed Coordination Function) scheme and the PCF (Point Coordination Function) scheme.

The PCF scheme is a centralized medium access control scheme based on polling, specifically, the scheme where a Point Coordination (PC) administering the BSS controls the medium access of all STAs 20 belonging to the BSS.

The PC can be either each STA 20 or the AP 10 for performing wireless communication through the wireless LAN.

In the PCF scheme, a Contention-free Period (CFP) and a Contention Period (CP) are alternately repeated. In a repeated interval of the CFP, only the STA 20 getting a poll from the PC can have the poll.

Further, in a repeated interval of the CP, each STA 20 within the BSS has contention in order to get the poll, and the STA 20 surviving the contention occupies the wireless media to exchange frames. However, the DCF is the scheme where each STA 20 checks whether the wireless media is busy according to Carrier Sense Multiple Access/Collision (CSMA/CA). If so, the STA 20 waits for a predetermined time. Then, if the wireless media is not busy, i.e., is in an idle state, the traffic is transmitted after a back-off procedure.

Figure 2:
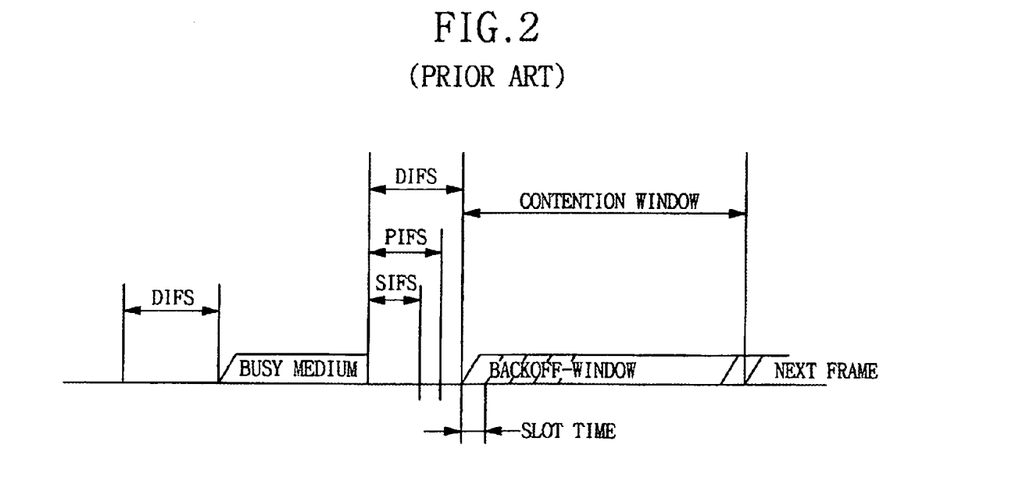
FIG. 2 is a view of the timing of a DCF access control scheme according to IEEE 802.11.

FIG. 2 is a view of the timing of an access control scheme of a DCF according to IEEE 802.11.

As shown in FIG. 2, the STA 20 makes use of a contention-based algorithm known as the CSMA/CA, which is the access control scheme defined in the IEEE 802.11 standard.

In the CSMA/CA based wireless LAN system, the STA 20 checks whether the wireless media is busy. If so, the STA 20 waits for a predetermined time, and then, if the wireless media become idle, the STA 20 decreases a back-off time. The predetermined time for which each STA 20 waits in order to initiate transmission of traffic is called an Interframe Space (IFS). As shown in FIG. 2, there are three IFSs for the MAC protocol traffic. DIFS refers to a DCF Interframe Space, PIFS refers to a PCF Interframe Space, and SIFS refers to a Short Interframe Space.

A description follows of an example of the STA 20 employing the DCF transmitting frames.

The STA 20 employing the DCF checks whether the wireless media is busy before transmitting the frames. If the media is idle for a time equal to or greater than a DIFS (DCF Interframe Space), then the STA 20 initiates the back-off procedure. The STA 20 does not occupy the wireless media to transmit the frames until a value of a back-off timer becomes equal to zero (0).

In the back-off procedure, a value of a random back-off time is assigned to the back-off timer. The random back-off time is in accordance with the following Equation 1.

Back-off Time=random( )*slot time  <Equation 1> where, random( )=a random integer having a uniform probability distribution in an interval of [0, CW], and CW=Contention Window, CWmin<=CW<=CWmax.

The back-off time is reduced as much as the slot time whenever the media maintains an idle state during the slot time, but is no longer reduced when the medium is switched into the busy state.

After the media become idle during DIFS, the back-off time can be reduced as much as the slot time again. The back-off time is not a created value, but the value of the back-off time just before the media become busy.

Moreover, a time slot reduces the back-off time set to any one of the STAs 20 while the media is idle. Further, when the STA 20 must perform retransmission contention due to a failure in a transmission contention, the beginning time slot reduces the back-off time with the value reduced in the previous transmission contention. As such, the STA 20 can not initiate transmission until the back-off time becomes equal to zero (0).

Even if a queue is empty, that is, even if there is no frame to be transmitted, the STA 20 succeeding in transmission assigns the random back-off time to the back-off timer according to the back-off procedure. Thereby, each STA 20 must require one back-off time between the frame transmissions.

The DCF access control scheme is more easily realized than the PCF access control scheme, does not require a complicated calculation procedure such as scheduling, and has a flexible characteristic. For these reasons, when other STAs 20 do not occupy the wireless media, an STA 20 having a large number of frames for transmission can make use of many bands.

However, with respect to saving power, the DCF access control scheme is considerably limited because it can only be used for a talk standby time of the STA 20.

Figure 3:
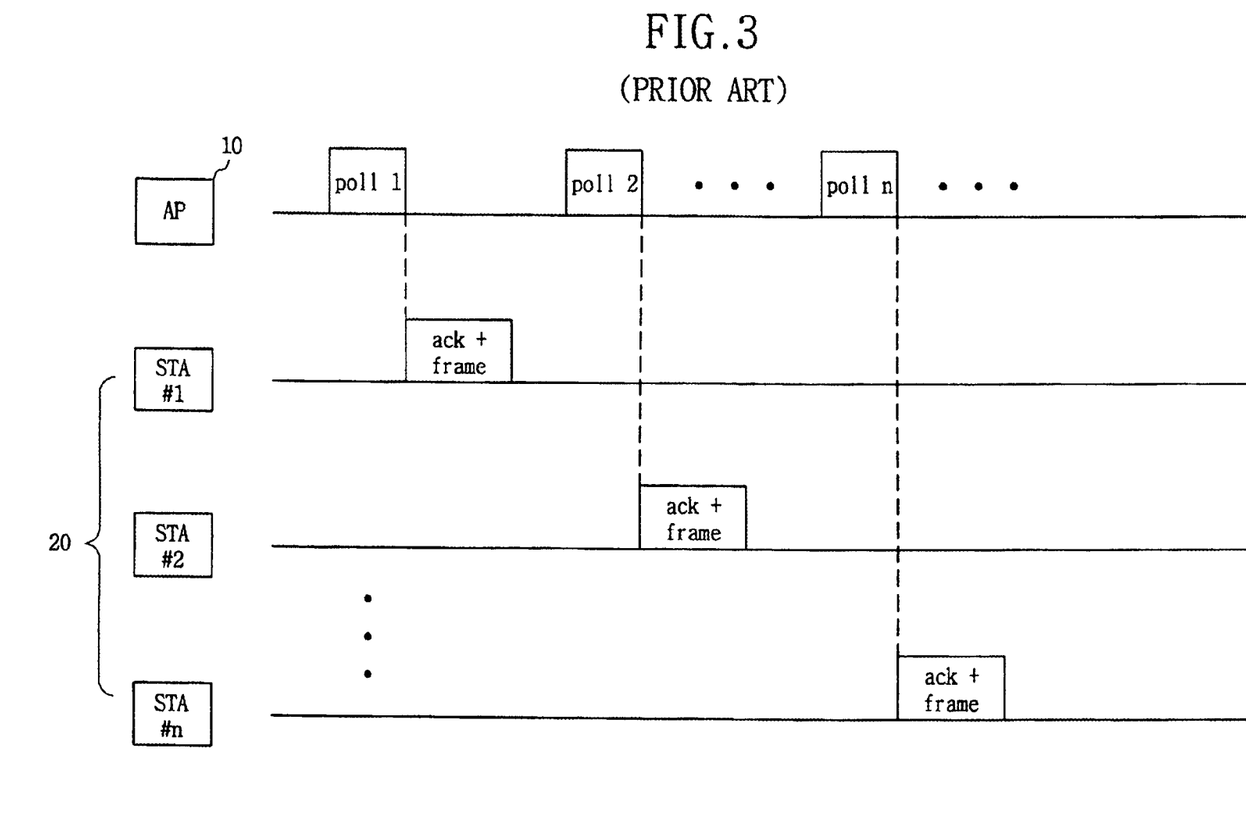
FIG. 3 is a view of the timing of a PCF access control scheme according to IEEE 802.11.

FIG. 3 is a view of the timing of a PCF access control scheme according to IEEE 802.11.

As shown in FIG. 3, the AP 10 polls each STA 20, and the STA 20 assigned the poll from the AP 10 acknowledges its own poll and then transmits a frame.

In other words, the AP 10 sequentially polls each STA 20 placed on its polling list, and then the STA 20 assigned the poll from the AP 10 effects an acknowledgment to exchange frames upon receiving its own poll.

The PCF access control scheme is described in detail below with reference to FIG. 4.

Figure 4:
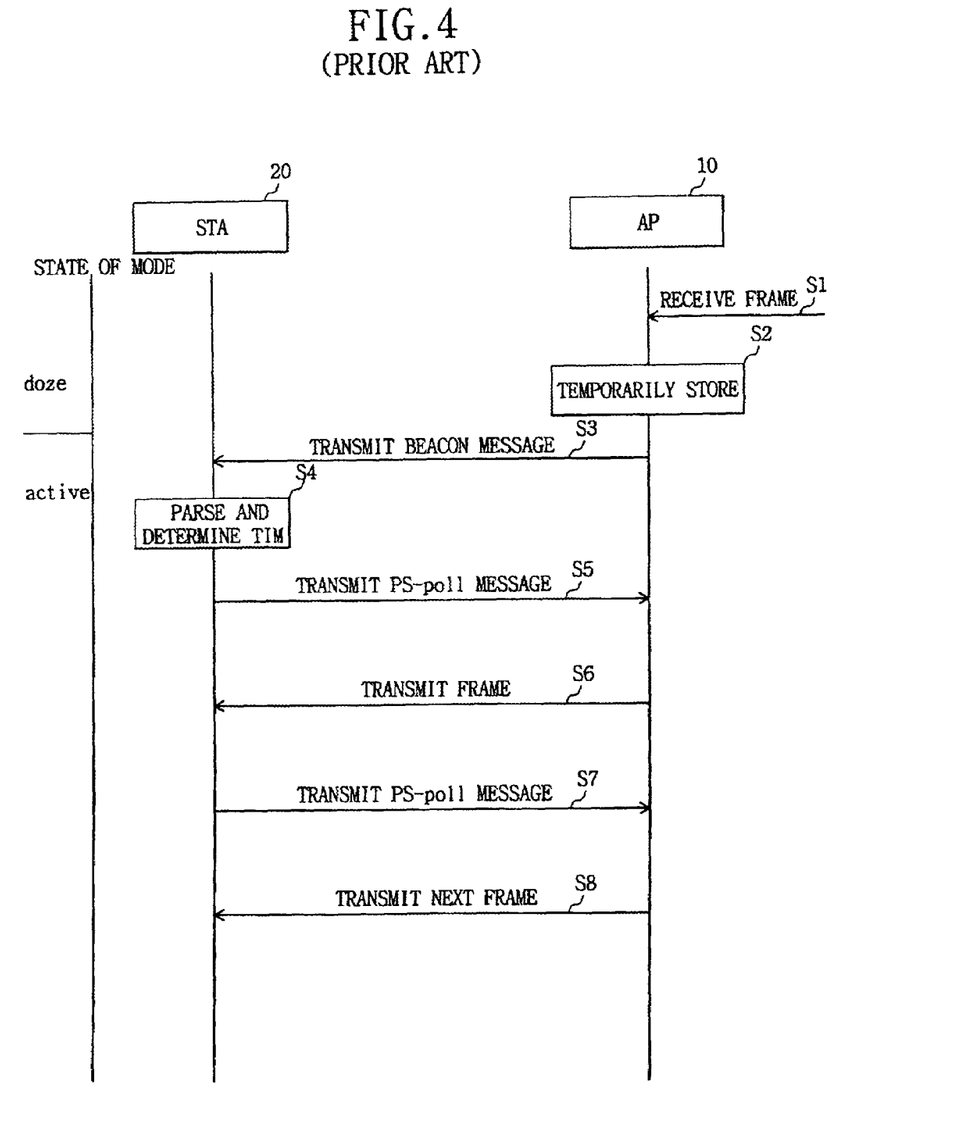
FIG. 4 is a view of steps of an algorithm for saving power in a PCF access control scheme.

FIG. 4 is a view of steps of an algorithm for saving power in a PCF access control scheme.

Referring to FIG. 4, the AP 10 receives frames intended to be transmitted to the STA 20 from another network (not shown) (S1), and then stores the received frames (S2).

Then, the AP 10 detects the STA 20 intended to receive the frames, sets a bit of a traffic indication map (TIM) corresponding to the detected STA 20 to '1" to generate a beacon message, and transmits the generated beacon message to each STA 20 (S3).

The AP 10 transmits the generated beacon message in a broadcast fashion so that all of the STAs 20 within the BBS area receive the generated beacon message.

Then, each STA 20 wakes up from a doze mode and returns to an active mode, and checks the TIM of the received beacon message (S4).

If the TIM is '0,' then the STA 20 determines that there is no frame which it will receive, returns to the doze mode again, and waits for the next beacon message.

However, if the TIM is '1,' then the STA 20 determines that there is a frame which it will receive, and generates and transmits a PS-poll message as an acknowledgement of the polling from the AP 10 (S5).

When the PS-poll message is received from the STA 20, the AP 10 transmits the frame, which is temporarily stored in the poll to the STA 20, through a wireless medium (S6).

Then, when the frame is received from the AP 10, the STA 20 transmits the PS-poll message as the acknowledgement of the next poll (S7), and receives the next frame (S8).

Similarly, when there is a frame to be transmitted to the AP 10, each STA 20 acknowledges the polling from the AP 10, and transmits the frame of its own poll to the AP 10.

In the PCF access control scheme, each STA 20 checks the bit of the TIM of the beacon message received from the AP 10. If the bit of the TIM is set to '1,' the STA 20 must always maintain the active mode from when the beacon message has been received to when the frame has been received.

In other words, because the STA 20 does not know the time point when the frame intended to be received has been received from the AP 10, a problem occurs in that the STA 20 must always maintain the active mode during voice communication.

Figure 5:
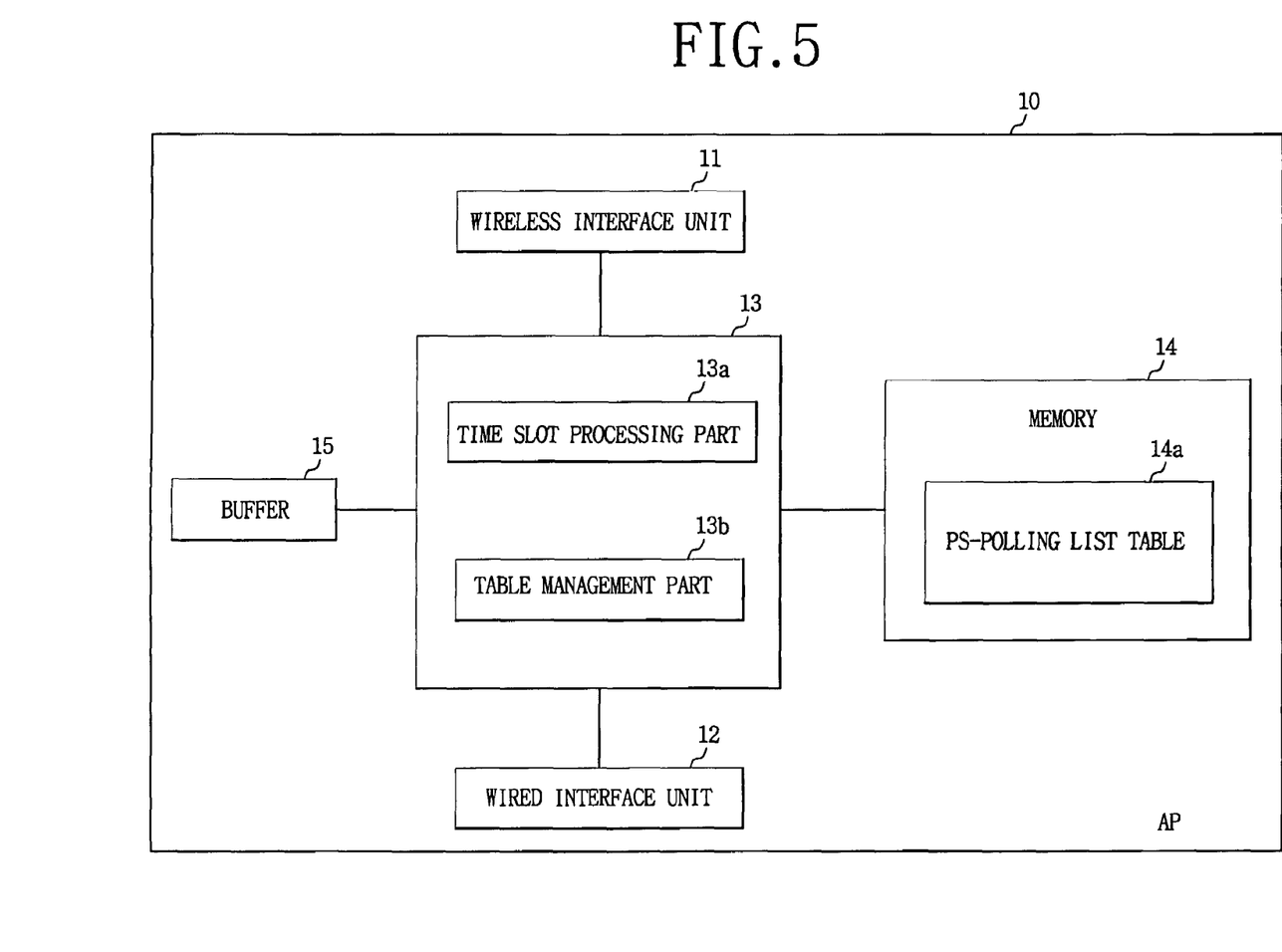
FIG. 5 is a block diagram of an internal configuration of a wireless local area network (WLAN) access point according to an embodiment of the present invention.

FIG. 5 is a block diagram of an internal configuration of a Wireless Local Area Network (WLAN) access point according to an embodiment of the present invention.

Referring to FIG. 5, the WLAN access point 10 includes a wireless interface unit 11, a control unit 13, a storage unit 14, a wired interface unit 12 and a buffer 15, wherein the control unit 13 is composed of a time slot processing part 13a and a table management part 13b.

The storage unit 14 stores a PS-polling list table 14a.

The wireless interface unit 11 interfaces to allow the WLAN access point 10 to perform wireless communication with each station (STA) 20 over a WLAN.

The wired interface unit 12 interfaces to allow the WLAN access point 10 to transmit and receive frames over a wired network (not shown).

The buffer 15 temporarily stores the frames that the WLAN access point 10 has received over the wired network or WLAN.

The storage unit 14 stores information on operation of the WLAN access point 10, information on Internet protocol addresses which are assigned to make it possible to perform wired/wireless communication, and so forth.

Further, the PS-polling list table 14a of the storage unit 14 includes information on numbers, addresses, and time durations of time slots for each STA 20 which the WLAN access point 10 manages at present.

The control unit 13 generates beacon messages according to a point coordination function (PCF) and transmits the generated beacon message to each STA 20. In addition, the control unit 13 assigns a time slot to each STA 20 and exchanges the frames with the STAs 20 during the time slot.

The time slot processing part 13a of the control unit 13 assigns the time slot to each STA 20, which the WLAN access point 10 manages at present.

The time slot, which the time slot processing part 13a assigns to each STA 20, is the time needed for the corresponding STA 20 to exchange the frames with the WLAN access point 10 through the wireless communication.

The time slot processing part 13a is capable of calculating the number of the STAs 20 managed simultaneously during a Contention Free Period (CFP) in accordance with the following Equation 2.

$$Nx = (\text{CFP interval} - \text{max. allowed beacon slot})(\text{sec}) / (\text{length of a time slot})(\text{sec}) \quad \text{<Equation 2>}$$

where, 'Nx' is the number of the STAs 20 which the WLAN access point 10 can simultaneously manage, 'CFP interval' is the time for the CFP, and the 'max. allowed beacon slot' is the transmission time of the beacon messages which the WLAN access point 10 transmits to each STA 20.

Furthermore, the 'length of a time slot' is the time duration of each time slot, which the WLAN access point 10 assigns to each STA 20. The time duration of each time slot can be calculated by the following Equation 3.

$$(\text{length of a time slot})(\text{sec}) = \text{SIFs} + \{(\text{link speed})(\text{bps}) / (\text{length of a voice packet})(\text{bits})\} \quad \text{<Equation 3>}$$

SIFs is the minimum interval time needed for transmitting the frame, the 'link speed' is the transmission speed of the frame between the WLAN access point 10 and each STA 20, and the 'length of a voice packet' is the length of one voice frame.

In other words, the time duration of the time slot with which the WLAN access point 10 provides each STA 20 is the time duration when the corresponding STA 20 occupies the wireless media for a predetermined time to effect wireless communication.

The table management part 13b of the control unit 13 manages the PS-polling list table 14a which is stored in the storage unit 14.

Specifically, the table management part 13b manages information on numbers, addresses, and time durations of time slots for each STA 20, which the WLAN access point 10 manages at present.

The PS-polling list table can have a structure as in the following Table 1.

TABLE 1

| STA No. | STA number | Time slot information |
|---------|------------|----------------------|
| 1       | STA 20 #1  | 0.1 ms               |
| 2       | STA 20 #2  | 0.8 ms               |
| ~       | ~          | ~                    |
| n       | STA 20 #N  | 0.8 * n ms           |

As set forth in Table 1, the PS-polling list table 14a is provided with information on an STA number, information on each numbered STA 20, and time information of the time slot assigned to each STA 20.

The time information of the time slot relates to the time when the corresponding STA 20 is capable of exchanging the frames with the WLAN access point 10 by receiving the beacon message to be awakened from a doze mode into an active mode.

The table management part 13b manages the PS-polling list table 14a in such a manner that each STA 20 is not performing registration according to a registration request transmitted in the process of approaching a service area of the WLAN access point 10, but manages only the STA 20 which is currently performing wireless communication.

In other words, the table management part 13b allows only the STA 20, which transmits a PS-poll message in order to exchange frames, to be registered on the PS-polling list and to be managed.

For example, when the frame to be transmitted to the STA 20 #1 is temporarily stored in the buffer 15, the control unit 13 sets a bit of a traffic indication map (TIM) corresponding to the STA 20 #1 to '1' to generate the beacon message, and transmits the generated beacon message to the STA 20 #1.

The STA 20 #1 parses the TIM of the beacon message received from the WLAN access point 10. When determining that its own bit is set to '1,' the STA 20 #1 generates the PS-poll message and transmits the generated PS-poll message to the WLAN access point 10.

Then, the table management part 13b of the WLAN access point 10 allows the STA 20 #1 transmitting the PS-poll message to be additionally registered in the PS-polling list table 14a.

In other words, the table management part 13b of the WLAN access point 10 does not register the STA 20 on the PS-polling list when the STA 20 approaches a BSS, but it registers the STA 20, which transmits the PS-poll message to exchange frames, on the PS-polling list.

Further, the WLAN access point 10 transmits the frame which is intended for transmission at the time period of the time slot which corresponds to the information of the number given to the corresponding STA 20 with reference to the PS-polling list.

In this manner, the table management part 13b manages only the STA 20 which performs wireless communication at present. This allows the WLAN access point 10 to manage each STA 20 in a more efficient manner. Thus, the table management part 13b manages only the STA 20, which has actually been busy, so that more STAs 20 can be simultaneously managed.

When the frames for transmitting to the STA 20 #2 are temporarily stored in the buffer 15, the control unit 13 sets a STA 20 #1 bit of TIM to '1' to generate the beacon message, and then transmits the generated beacon message to each STA 20. When the PS-polling message is received from the STA 20 #2, the table management part 13b applies the number 2 to the STA 20 #2, and then additionally registers the STA 20 #2 on the PS-polling list table 14a.

On the contrary, when a 'Re-association Request' message is received from the STA 20, which is registered on the PS-polling list, the table management part 13b deletes the corresponding STA 20 from the PS-polling list and then converts a number field given to the corresponding STA 20 into an empty state.

To be more specific, when the STA 20 which performs wireless communication at present transmits the 'Re-association Request' message in order to get out of the management of the WLAN access point 10, the table management part 13b checks whether any one of 'CF-Pollable (Contention-Free Pollable)' and 'CR-Poll Request' fields of the received 'Re-association Request' message is '0' or null. If any one field is '0,' the table management part 13b determines that the corresponding STA 20 intends to stop performing wireless communication, and thus deletes the corresponding STA 20 from the PS-polling list table 14a.

When a PS-poll message is received from any other STA 20, the table management part 13b provides the STA 20 with number information of the empty state, and then additionally registers the STA 20 on the PS-polling list table 14a.

Figure 6:
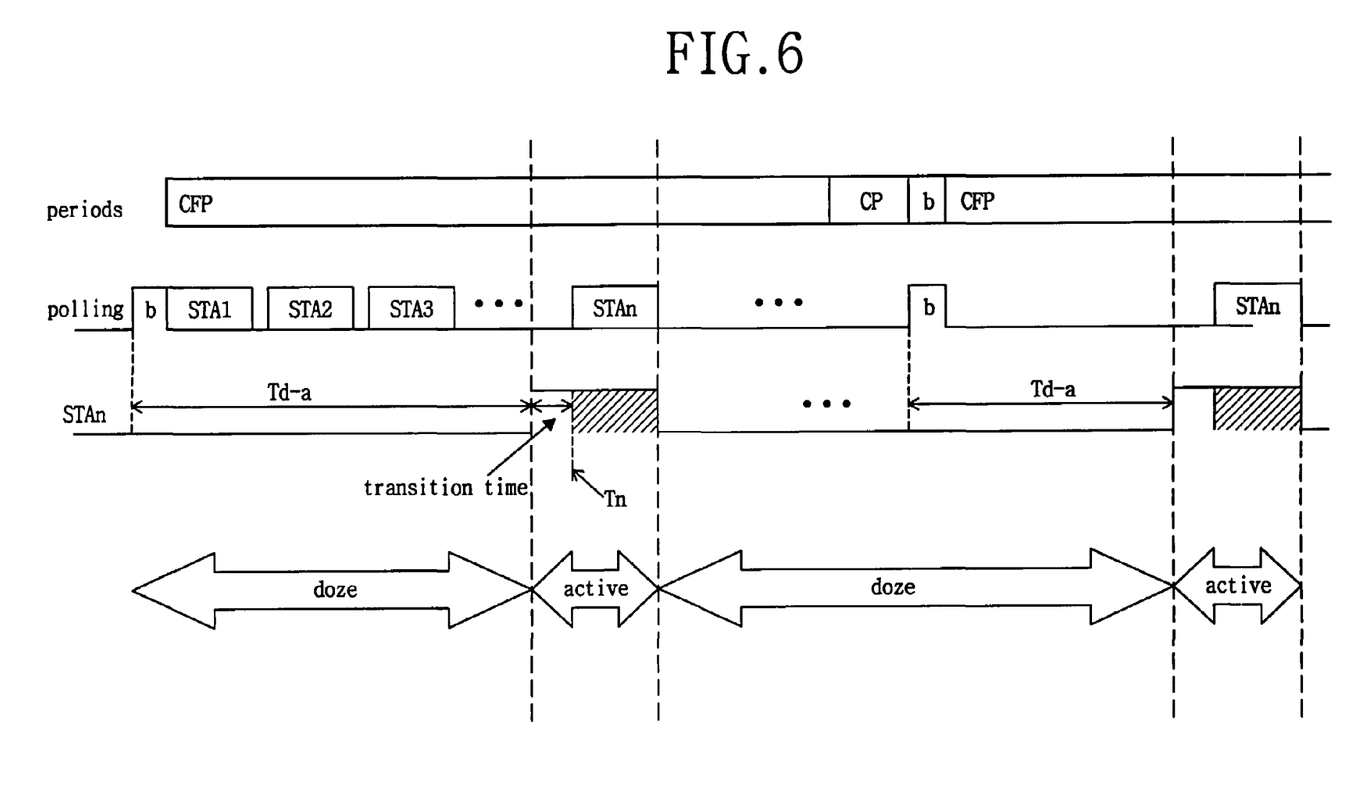
FIG. 6 is a view of the timing of a method for assigning a time slot in order to save power during WLAN based voice communication in accordance with an embodiment of the present invention.

FIG. 6 is a view of the timing of a method for assigning a time slot in order to save power during WLAN based voice communication in accordance with an embodiment of the present invention.

Referring to FIG. 6, it can be seen that both the CFP (Contention-Free Period) and CP (Contention Period) of each STA are repeated.

The CFP is a period using the PCF (Point Coordination Function) scheme in which a poll is sent to each STA according to the polling scheme of the WLAN access point 10, while the CP is a period making contention according to the DCF (Distributed Coordination Function) scheme in order for each STA 20 to obtain the poll.

A description follows regarding how the WLAN access point 10 exchanges frames with each STA 20 during the CFP in a busy state.

First, the time slot processing part 13a of the control unit 13 calculates a time of a time slot in accordance with Equation 2.

Then, the table management part 13b generates the PS-polling list table 14a according to the time duration of the time slot, which is calculated by the time slot processing part 13a, and stores the result in the storage unit 14.

When at least one frame intended for transmission to the STA 20 is received from a wired network (not shown), the control unit 13 of the WLAN access point 10 temporarily stores the received frame in the buffer 15, and detects the STA 20 to which the frame will be transmitted.

The control unit 13 causes a bit of a TIM corresponding to the STA 20 to which the frame will be transmitted to be set to '1' to generate a beacon message, and then transmits the generated beacon message to each STA 20.

Meanwhile, the STA 20 is awakened into an active mode from a doze mode when the beacon message is received from the WLAN access point 10, and parses the beacon message.

Subsequently, the STA 20 checks the TIM of the received beacon message, and determines whether or not its own bit is set to '1.'

If the bit of the TIM corresponding to its own bit is set to '0,' the STA 20 returns to the doze mode because there is no frame for the STA 20 to receive. If the bit of the TIM is set to '1,' the STA 20 allows a PS-poll message to be generated and transmitted to the WLAN access point 10 because there is a frame which the STA 20 is to receive.

The table management part 13b of the control unit 13 additionally registers the STA 20 which has transmitted the PS-poll message on the PS-polling list table 14a.

Specifically, the table management part 13b does not register the STA 20 on the PS-polling list when the STA 20 approaches a service area of the WLAN access point 10, but it does so when the STA 20 checks the beacon message to transmit the PS-poll message.

The STA 20 calculates the time of the time slot Tn that is assigned to itself.

The time of the time slot 'Tn' is a start time of an nth time slot. The STA 20 calculates the next time slot, namely the next wake-up time, in accordance with the following Equation 4.

$$Td-a = \text{next TBTT} + Tn - (\text{transition time}) \qquad \text{<Equation 4>}$$

where, 'Td-a' is the time when the STA 20 awakens the next time, 'next TBTT' is the time when the next beacon message is received and is the acronym to which 'Target Beacon Transmission Time' is abbreviated, 'Tn' is the time when the time slot assigned to the STA 20 starts, and 'transition time' is the time which it takes the STA to awaken from the doze mode into the active mode.

In other words, the STA 20 calculates the next time duration of the time slot so that the time duration for the next beacon message to be received is added to its own time duration of the time slot, and then the time duration which it takes the STA 20 to awaken from the doze mode into the active mode is subtracted from the added sum. When the next beacon message is received, the STA 20 is again awakened into the active mode after the calculated time has elapsed, receives the frame from the WLAN access point 10, and maintains the doze mode for the remaining time.

Further, when the STA 20 needs to transmit a voice frame to the WLAN access point 10, the STA 20 is awakened at the time of the time slot assigned to itself and then transmits the voice frame to the WLAN access point 10.

When the STA 20 receives no frames for a predetermined number of times during the time of its assigned time slot, the STA 20 determines that the time duration of its assigned time slot has varied, and then awakens during the time when the next beacon message is received, that is, the next TBTT.

In order to receive the next frame using Equation 4, the STA 20 again calculates the wake-up time Td–a, and is awakened from the doze mode into the active mode with reference to the calculated time to receive the next frame, and finally exchanges the previous frame for the next frame.

Figure 7:
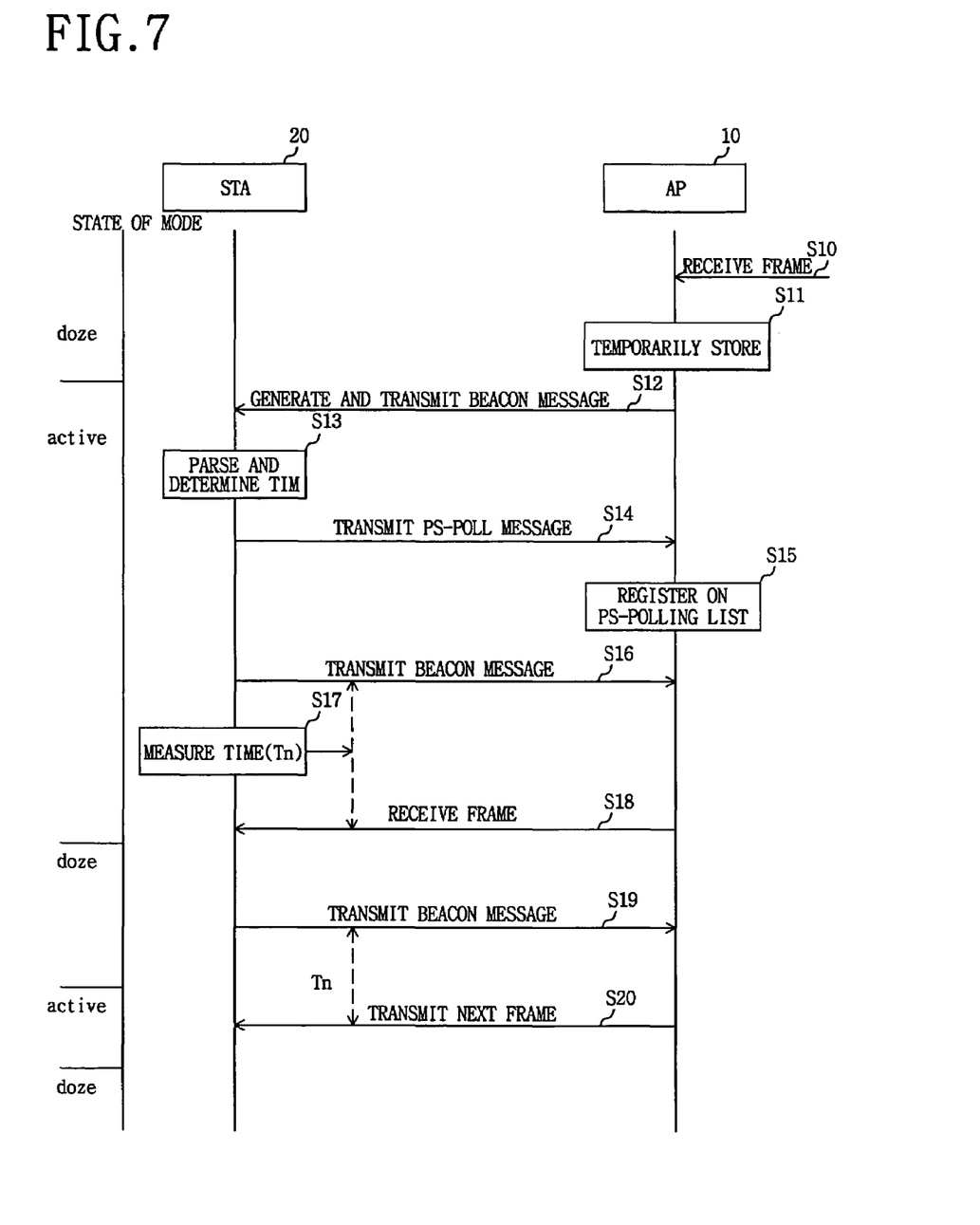
FIG. 7 is a view of the steps of a method for saving power during wireless LAN based voice communication in accordance with an embodiment of the present invention.

FIG. 7 is a view of the steps of a method for saving power during wireless LAN based voice communication in accordance with an embodiment of the present invention.

The method for saving power during wireless LAN based voice communication in accordance with an embodiment of the present invention is described in more detail below with reference to FIG. 7.

First, the time slot processing part 13a of the control unit 13 calculates time slots to be assigned to each STA 20 using Equations 2 and 3. The table management part 13b generates the PS-polling list table 14a with reference to a time of the time slot which the time slot processing part 13*a* calculates, and stores the result in the storage unit 14.

The WLAN access point 10 receives at least one frame, which is intended to be transmitted to the STA 20, from the wired network (not shown) (S10).

The control unit 13 of the WLAN access point 10 temporarily stores the received frame in the buffer 15 (S11), and detects the STA 20 to which the temporarily stored frame will be transmitted.

Further, the control unit 13 causes a bit of a TIM corresponding to the detected STA 20 to be set to '1' to generate a beacon message, and then transmits the generated beacon message to each STA 20 (S12).

Each STA 20 receives the beacon message while awakening from a doze mode into an active mode, parses the TIM of the received beacon message, and determines whether or not the bit of its own TIM is set to '1' (S13).

If the bit of its own TIM is set to '0,' then the STA 20 returns to the doze mode because there is no frame which the STA 20 is to receive. If the bit of its own TIM is set to '1,' then the STA 20 causes a PS-poll message to be generated and transmitted to the WLAN access point 10 because there is a frame which the STA 20 will receive from the WLAN access point 10 (S14).

The table management part 13*b* of the WLAN access point 10 additionally registers the STA 20 which has transmitted the PS-poll message on the PS-polling list table 14*a* which is stored in the storage unit 14.

Specifically, the table management part 13*b* of the WLAN access point 10 applies a number of an empty state where no number is given to the STA 20 with reference to the PS-polling list table 14*a* which is stored in the storage unit 14, and stores information of the corresponding STA 20 in a discriminative field of the STA 20 corresponding thereto.

The table management part 13*b* causes the WLAN access point 10 to reject transmission of the frame when there is no information on the number which is not applied to the STA 20, that is, when the number of the STAs 20 which the WLAN access point 10 can simultaneously manage is at a maximum.

When there is any STA 20 where an exchange of frames has been terminated, the table management part 13*b* deletes the STA 20 from the PS-polling list table 14*a*, and converts the field of the STA 20 into the empty state. Then, when transmission of a frame is requested, i.e., when an exchange of a frame is requested by the STA 20, the table management part 13*b* assigns the number corresponding to the field which exists on the PS-polling list table 14*a* in the empty state to the STA 20, adds information of the STA 20 to the empty field, and provides the STA 20 with a time slot corresponding to the number.

When the table management part 13*b* additionally registers the STA 20 on the PS-polling list, the control unit 13 sets the bit of the TIM of the STA 20 to '1' to generate the beacon message, and transmits the generated beacon message to each STA 20 (S16).

Then, when the beacon message is received, the STA 20 calculates and stores the time Tn when the frame is received, i.e. the start time of the time slot assigned to the STA 20.

Further, the STA 20 calculates the start time Tn of the time slot, and then calculates the wake-up time Td–a for receiving the next frame using the calculated start time Tn in accordance with Equation 4.

The calculated wake-up time 'Td–a' refers to the time when the STA 20 receives the beacon message from the WLAN access point 10, awakens from the doze mode into the active mode after the wake-up time 'Td–a' has elapsed from the time when the beacon message was received, and receives the frame from the WLAN access point 10 (S17).

Subsequently, the STA 20 receives the frame from the WLAN access point 10 (S18), and proceeds from the active mode into the doze mode.

Furthermore, the STA 20 receives a first frame during its own time slot, is placed into the doze mode, receives the next beacon message (S19), is awakened into the active mode when the start time Td–a for receiving the next frame, which is calculated during the time when the next beacon message has been received, has elapsed, and receives the next frame from the WLAN access point 10 (S20).

Then, the STA 20 receiving the next frame is again returned to the doze mode, and is on standby until the next beacon message is received.

When a re-association request signal is received from the STA 20, i.e., when the STA 20 transmits a 're-association request' message to end management by the WLAN access point 10, the table management part 13*b* of the WLAN access point 10 deletes the STA 20 from the PS-polling list table 14*a*, and converts the number of the STA 20 into the empty state.

The table management part 13*b* checks whether 'CF-Pollable' and 'CF-Poll Request' fields of the received 're-association request' message are '0.' If the fields are '0,' the table management part 13*b* determines that the STA 20 has stopped performing a communication, and deletes the STA 20 from the PS-polling list table 14*a*.

Furthermore, when the STA 20 fails to receive the frame at a predetermined time during the time of its assigned time slot, i.e., when the STA 20 fails to perform wireless communication during its own time slot, the STA 20 determines that its assigned time slot has changed, and awakens at the time, TBTT, when the next beacon message is received.

The STA 20 calculates the wake-up time, Td–a, for receiving the next frame using Equation 4 again, and is awakened from the doze mode into the active mode in order to receive the next frame with reference to the calculated wake-up time, and exchanges the frame.

Although an embodiment of the present invention has been described for illustrative purposes, those skilled in the art will appreciate that various modifications, additions and substitutions are possible, without departing from the scope and spirit of the present invention as recited in the accompanying claims.

As can seen from the foregoing, according to the present invention, the time for the voice communication can be improved by efficiently managing the ratio of the doze/active mode of the STA during voice communication to decrease power consumption of the STA.

In general, the STA is classified into the doze mode and the active mode, in which the active mode is sub-classified into a send state, a receive state and an idle state. Even the idle state of the active mode has a power consumption more than 50% of the sum of those of the send and receive states.

However, with the present invention, for example, in the case of 20 ms for the CFP, 1 ms for the wake-up time when the STA awakens from the doze mode into the active mode, and 1 ms for the frame transmission time, the ratio of the doze/active mode can be reduced to 10% in comparison with an existing ratio of 100%.

Thus, if a communication time would be 2 hours for an existing mode, the present invention can ideally increase it up to 10 hours.

What is claimed is:

1. An apparatus comprising:
   at least one AP (Access Point) arranged to set and transmit a bit of a beacon message corresponding to a station for exchanging traffic, to register the station on a PS-polling list upon an acknowledgment of the beacon message being received, a time slot calculator to assign a predetermined time slot to the station, and to transmit the at least one piece of traffic during the time slot, when at least one piece of traffic is to be exchanged for wireless voice communication; and at least one station adapted to be awakened into an active mode to parse the received beacon message, to calculate the assigned time slot when a bit of the station is set, and to awaken into the active mode during the assigned time slot to exchange the at least one piece of traffic, when the beacon message has been received from the AP upon being in a doze mode;

wherein the time slot calculator is adapted to determine that the start time of the time slot has varied upon frames not being exchanged for a predetermined number of times between the start time of the time slot assigned by the AP and the end time of the time slot, and to recalculate the start time of the time slot in response to the determination.

2. An apparatus comprising:

a beacon message processor adapted to detect at least one of a plurality of stations intended to receive at least one piece of traffic, to set a bit of a TIM (Traffic Indication Map) corresponding to the detected station to generate a beacon message, and to transmit the generated beacon message to each station, when there is at least one piece of the traffic to be transmitted to the plurality of stations;

a time slot processor adapted to calculate a predetermined time slot to be assigned to each station; and a table management unit adapted to provide number information to the station, to generate and manage a table storing address information and time slot information of the station upon an acknowledgment message of the beacon message being received from the station intended to receive the at least one piece of traffic;

wherein a time slot processor is adapted to determine that the start time of the time slot has varied upon frames not being exchanged for a predetermined number of times between the start time of the time slot and the end time of the time slot, and to recalculate the start time of the time slot in response to the determination.

3. An apparatus comprising:

a message processor adapted to parse a TIM (Traffic Indication Map) of a beacon message received from an AP (Access Point) and to determine whether or not a bit of the TIM of a station has been set;

a time slot calculator adapted to calculate a time when the beacon message is to be received, a start time of a time slot when traffic is to be initially received from the AP and an end time of the time slot when reception of traffic is to be terminated, upon a determination that the bit of the TIM of the station has been set by the message processor; and a mode processor, adapted to be awakened into an active mode upon the beacon message being received when in a doze mode, awakened into the active mode at the start time of the time slot calculated by the time slot calculator upon the determination that the bit of the TIM of the station has been set by the message processor, and to be placed into the doze mode again at the end time of the slot time;

wherein the time slot calculator is adapted to determine that the start time of the time slot has varied upon frames not being exchanged for a predetermined number of times between the start time of the time slot assigned by the AP and the end time of the time slot, and to recalculate the start time of the time slot in response to the determination.

4. The apparatus according to claim 3, wherein the mode processor is adapted to maintain the active mode so as to allow the start time of the time slot to be calculated by the time slot calculator upon a determination that there is traffic to be received by parsing the beacon message received from the message processor, and to then maintain the active mode only between the start time of the time slot and the end time of the time slot while maintaining the doze mode.

5. A method comprising:

setting a bit of a TIM (Traffic Indication Map) corresponding to a station to generate a beacon message and transmitting the generated beacon message to each station upon there being traffic to be transmitted to an arbitrary station;

calculating a predetermined time slot and assigning the time slot to each station;

assigning number information to the stations and registering the stations on a PS-polling list upon an acknowledgment message of the beacon message being received from the station; and assigning the calculated time slot according to the number information assigned to the stations registered on the PS-polling list, and transmitting the traffic during the time slot assigned to the stations;

determining that the start time of the time slot has varied upon frames not being exchanged for a predetermined number of times between the start time of the time slot and the end time of the time slot, and recalculating the start time of the time slot in response to the determination.

6. The method according to claim 5, wherein the PS-polling list includes at least one of number information of the stations transmitting the acknowledgment message, information of the stations, and information on the start time of the time slot assigned to the stations.

7. A method comprising:

awakening at least one station from a doze mode into an active mode and parsing a TIM (Traffic Indication Map) of a beacon message upon the beacon message being received from an AP (Access Point);

generating and transmitting an acknowledgment message of the beacon message upon a bit of the TIM assigned to the station being set;

calculating a time between the next beacon message being received and the traffic being received after transmission of the acknowledgment message;

placing the station in the doze mode upon the traffic being received, awakening the station into the active mode again upon the calculated time having elapsed, and receiving the traffic from the AP; and recalculating a time for awakening the station into the active mode to receive the traffic upon traffic not being received for a predetermined number of times during the time slot assigned by the AP.

8. A method comprising:

setting a bit of a TIM (Traffic Indication Map) of a station to generate and transmit a beacon message;

awakening the station from a doze mode into an active mode and parsing the TIM of a received beacon message upon the beacon message being received;

transmitting an acknowledgment message of the beacon message to calculate a time when the traffic is to be received from an AP (Access Point) as the parsed result upon the TIM of the station being set;

registering the station on a PS-polling list at the AP upon the acknowledgment message being received from the station;

transmitting the traffic during a time slot assigned to the station with reference to the PS-polling list at the AP;

calculating a time from the station receiving the beacon message to a time that the traffic begins to be received;

placing the station from the active mode into the doze mode upon reception of the traffic from the AP being completed; and awakening the station into the active mode after being on standby for the calculated time in the doze mode, and receiving the next traffic from the AP.

9. The method according to claim 8, further comprising awakening the station into the active mode during the time slot assigned by the AP to transmit the traffic upon there being traffic to be transmitted to the AP.

10. The method according to claim 8, further comprising recalculating a time for awakening the station into the active mode to receive traffic upon traffic not being received for a predetermined number of times during the time slot assigned by the AP.

* * * * *